A. E. & J. B. Blood,
Sieve.
Nº 31,149. Patented Jan. 22, 1861.
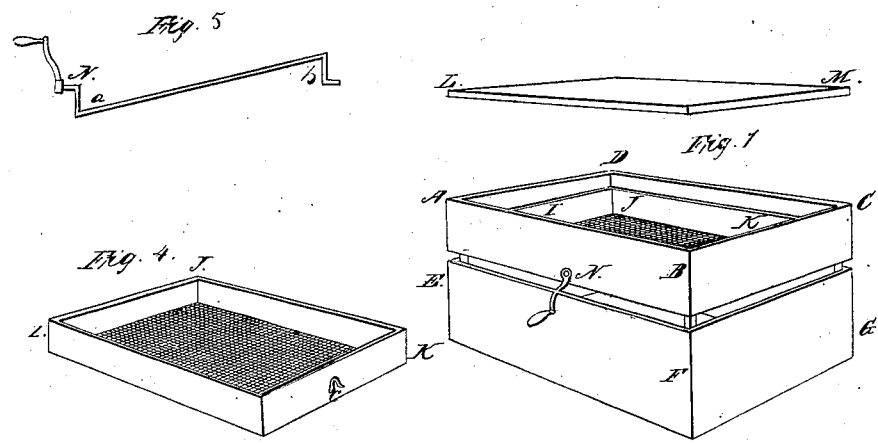
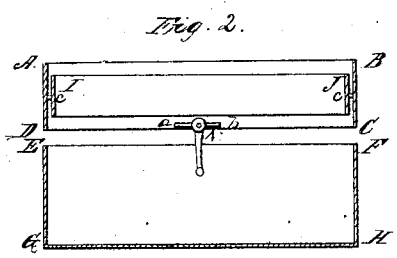
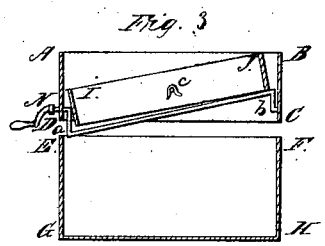
Witnesses
Cyrus M. Tracy
Jarvis A. Ames
Inventor
Abijah E. Blood
Josiah B. Blood

UNITED STATES PATENT OFFICE.

ABIJAH E. BLOOD AND JOSIAH B. BLOOD, OF LYNN, MASSACHUSETTS.

SIEVE.

Specification of Letters Patent No. 31,149, dated January 22, 1861.

*To all whom it may concern:*

Be it known that we, ABIJAH E. BLOOD and JOSIAH B. BLOOD, both of Lynn, in the county of Essex and Commonwealth of Massachusetts, have invented a new and useful improvement in the manner of constructing and operating sieves, to be used for any purpose to which sieves are commonly applied, but especially adapted to the sifting of anthracite coal after burning; and we do hereby declare that the following is a full, clear, and exact description of the construction and operation of the same, reference being had to the annexed drawings, making a part of this specification, and to the letters of reference marked thereon.

We construct our sieves in any required form either rectangular, circular, or polygonal, and of such depth and capacity as may be desired. On the exterior, opposite sides, and on a line passing through the center, we place two metallic ears, or boxes, in such way as to admit the sieve to be suspended by them upon two opposite points, or pivots, and there to be balanced and vibrate freely. We determine the proper place of this line of suspension to be at that height above the mesh of the sieve which will, when the sieve with its contents is made to vibrate reciprocally, insure the greatest degree of motion in the mass contained, and the most even distribution of the same over the meshes; and this height will be very nearly half way from the meshes to the top of the sieve, when the greatest space which the latter moves through in its operation is equal to its own depth. We proceed to adapt two opposite projecting pivots on the interior sides of a rectangular or other suitably shaped box, or case, so that the sieve may be suspended on them by means of the ears or boxes before described, and may vibrate freely in the inclosure. We place these pivots so far below the top of the case that the moving sides of the sieve may not rise above said top during its operation, so that the whole may be closely covered to prevent the escape of dust, without impeding the motion of the machine. For the purpose of giving motion to our sieve when thus suspended, we place below it, upon suitable bearings or journals, a bent shaft of proper size, having formed in it two opposite crank-like bends, which alternately act on and lift the two moving sides of the sieve, placed immediately above them. We form the sides of these bends square with the axis of the shaft, on the outer sides, but between the bends, we make the shaft to run directly from the summit of one bend, across the axis, to the summit of the other bend, keeping a straight line between. We make the radius of these bends equal to the distance of the meshes of the sieve below the line of suspension, or nearly so; and we make the distance from the inside of one bend to that of the other a little greater than the extreme length of the sieve, measuring through the center of the latter, at right angles to its line of suspension. We allow one end of said shaft to project through the case, and thereon place a crank for turning the machine. And we so adjust the position of this shaft, that when the sieve is horizontal, the two bends shall be horizontal also, extending in opposite directions under the two moving sides of the sieve, and only so far from them as will prevent crowding between the sieve and shaft, as the latter revolves. We also adjust the axis of said shaft at right angles with the line of suspension of the sieve. By this arrangement, when the shaft is revolved, the two sides of the sieve are alternately lifted by the bends under them (being provided with some metallic surface to resist wear,) and thus a reciprocating or vibratory motion is produced, giving the most perfect movement to the contents of the sieve, in order to their separation. And we further declare that the annexed drawings fully and correctly represent said machine and its mode of operation in one of its forms, and show all the essential points of our said invention in whatever form constructed; and we explain said drawings as follows, that is to say:

Figure 1, is a perspective view showing the rectangular case A, B, C, D, adapted to sit upon and closely fit another similar box, E, F, G, H, intended as a receiver for the material passing through the sieve. Within the first mentioned case is suspended the sieve I, J, K, having its line of suspension always coincident with its longest diameter, (excepting diagonals). Above the whole, the cover L, M, is made to fit in any manner that will insure tightness; and the sieve itself may have an independent cover, over the whole or some part, either sliding laterally or turning on hinges. Across the upper case, below the sieve and at right angles with its line of suspension, is the bent shaft N, the opposite bends of which $a$, $b$, alternately lift the two sides of the sieve.

Fig. 5, shows the shaft detached, with the exact form of the bends, and position of the crank for turning the whole.

Fig. 4, exhibits the sieve detached, showing the position of the ears or boxes on which it moves, ($c\ c$).

Fig. 3, is a section in elevation parallel with the shaft, showing the position of it with reference to the sieve, and the manner in which the latter is tilted by the bends, alternately. The depth of the case should be such that the top of the sieve shall not rise above it, as is shown in this figure.

Fig. 2, is a section parallel with the line of suspension of the sieve, and showing the position of the two bends in the shaft N, when the sieve is horizontal.

We construct the lower case, E, F, G, H, in some instances, with inclined shelves or boards inside, by which the matters falling from the sieve may be properly directed into a barrel, which may thus be used as a receiver, the bottom of the case being left open accordingly.

We are aware that a sieve has been suspended within a box or case by means of rods or suspension bars and that there has been applied to such sieve for the purpose of operating it, two connecting rods and a shaft provided with two bell cranks, the whole being as represented in the specification and drawings of the United States patent numbered 14505. We do not claim such a mechanism for operating a sieve, nor do we claim its arrangement with respect to the sieve, as the said mechanism, arranged and applied to a sieve, as exhibited in such patent, produces when in operation, different movements and actions, of the sieve from what are effected by our invention, for while our said invention effects a tilting movement of the sieve, the other, produces a reciprocating, pendulous or swinging motion of it. By means of the tilting movement, gravity is brought into action in such manner as to cause the material to be sifted to pass in opposite directions from the middle of the sieve and next back toward such middle, this operation being very favorable for sifting or screening the material. Furthermore, our improvement greatly simplifies the construction of the sifter as it dispenses with connecting rods or pitmen and enables the sieve to be easily removed from its case, the sieve being not only disconnected from the case, but from the cranked shaft thereof. By means of our invention, the sieve while in vibration, will tilt alternately into the angular openings or bends, $a$, $b$, and will be tilted by that part of the shaft, which joins the vertices of such bends.

What therefore, we claim as our invention is—

The above arrangement of the shaft N, and the supports or bearings, $c$, $c$, of the sieve with respect to such sieve and its case, when the shaft N, is constructed substantially as described and represented.

ABIJAH E. BLOOD.
   JOSIAH B. BLOOD.

Signed in presence of us:
 CYRUS M. TRACY,
 JARVIS A. AMES.